(12) United States Patent
Cohen et al.

(10) Patent No.: US 10,710,899 B2
(45) Date of Patent: Jul. 14, 2020

(54) WATER PURIFICATION DEVICE

(71) Applicant: Caryn Anne Cohen, Parkwood (ZA)

(72) Inventors: Caryn Anne Cohen, Parkwood (ZA);
Gavin Charles Payne, New South Wales (AU)

(73) Assignee: Caryn Anne Cohen, Parkwood (ZA)

( * ) Notice: Subject to any disclaimer, the term of this patent is extended or adjusted under 35 U.S.C. 154(b) by 40 days.

(21) Appl. No.: 15/576,476

(22) PCT Filed: May 23, 2016

(86) PCT No.: PCT/IB2016/053015
§ 371 (c)(1),
(2) Date: Nov. 22, 2017

(87) PCT Pub. No.: WO2016/189452
PCT Pub. Date: Dec. 1, 2016

(65) Prior Publication Data
US 2018/0155209 A1  Jun. 7, 2018

(30) Foreign Application Priority Data

May 22, 2015 (ZA) .................................. 2015/03669

(51) Int. Cl.
*C02F 1/00* (2006.01)
*A45F 3/16* (2006.01)
*A45F 3/20* (2006.01)

(52) U.S. Cl.
CPC ................ *C02F 1/002* (2013.01); *A45F 3/16* (2013.01); *A45F 3/20* (2013.01); *C02F 1/003* (2013.01);
(Continued)

(58) Field of Classification Search
CPC ...... C02F 1/002; C02F 1/003; C02F 2307/02; C02F 2307/04; A45F 2003/163
See application file for complete search history.

(56) References Cited

U.S. PATENT DOCUMENTS

| 1,267,417 A * | 5/1918 | Jones ...................... C02F 1/002 |
| | | 210/318 |
| 2007/0068863 A1* | 3/2007 | Liu .......................... C02F 1/003 |
| | | 210/282 |

(Continued)

FOREIGN PATENT DOCUMENTS

WO  2013044079 A1  3/2013

OTHER PUBLICATIONS

International Search Report dated Nov. 7, 2016, from International Application No. PCT/IB2016/053015, 2 pages.
(Continued)

*Primary Examiner* — Benjamin M Kurtz
(74) *Attorney, Agent, or Firm* — Meunier Carlin & Curfman LLC

(57) ABSTRACT

This invention concerns a fluid purification device. The device has container, a nozzle and a removable filter element. The container is preferably a bottle and has at least partially flexible sidewalls so that it is collapsible from a first, operative condition into a second, inoperative condition. The nozzle is connectable to the container and defines a first fluid flow path along which fluid flows when, in use, filling the container and a second fluid flow path along which fluid flows when, in use, dispensing fluid from the container. The removable filter element is carried by the nozzle such that it is positioned in the first fluid flow path so that the fluid is filtered when filling the container and positioned outside the second fluid flow path so that the flow of fluid is unobstructed by it when dispensing fluid from the container. The invention also concerns a method of filtering a fluid.

8 Claims, 15 Drawing Sheets

(52) U.S. Cl.
CPC ... *A45F 2003/163* (2013.01); *A45F 2003/205* (2013.01); *C02F 2307/02* (2013.01)

(56) References Cited

U.S. PATENT DOCUMENTS

| | | | |
|---|---|---|---|
| 2013/0075393 A1* | 3/2013 | Haynie | B65D 37/00 220/6 |
| 2014/0014571 A1 | 1/2014 | Nelson et al. | |

OTHER PUBLICATIONS

International Preliminary Report on Patentability dated Oct. 31, 2017, from International Application No. PCT/IB2016/053015, 9 pages.

* cited by examiner

WATER PURIFICATION DEVICE

BACKGROUND TO THE INVENTION

This invention relates to a water purification device. In particular, but not exclusively, the invention relates to a collapsible drinking bottle including a filter element for filtering fluid when filling the bottle.

In recent years there has been an increase in the demand for bottled water. One of the reasons for this increase in demand is the public's lack of confidence in the water quality of public water management systems. For this reason it is common practice to buy bottled water instead of drinking water from a tap. This is not only common practice when travelling to other cities or countries but also in local environments. For example, many people prefer to filter their own household tap water before drinking it. This is typically done by purification devices installed directly on the water supply piping or tap, or by purification devices in the form of containers or jugs from which the filtered water is then dispensed as required.

A problem with the above devices for filtering water is that it is not suitable for use other than domestic use. The design of these purification devices do not allow them to be used on the move. To address this shortcoming, several attempts have been made to design a purification device which can be used when travelling or simply be taken with when leaving the house.

One purification device that has been suggested is a flexible bag which has a filter element for filtering water when filling it. Although the bag can be easily transported it is particularly challenging drinking from it. Without any rigidity to the sidewalls of the bag it is generally difficult to lift it to dispense water. As a result, water is often spilled when trying to drink or pour water from the bag.

Another purification device that has been proposed is in the form of a bottle including a removable cap that carries a filter device. While the bottle has rigid sidewalls which facilitates holding and lifting of the bottle, the drinking action required to dispense water from the bottle is unnatural. This is largely due to the fact that the filter element is located in the water flow path both when filling the bottle and when dispensing water therefrom. By locating the filtering element in the water flow path when dispensing water a pressure has to be applied to the nozzle in order to obtain a sufficiently high flow rate. As a result, a user is typically required to apply a negative pressure to the nozzle by sucking thereon in order to get a desired flow rate. Alternatively, a positive pressure could also be applied to the bottle in order to squirt a jet of water from the nozzle. A person familiar with this type of purification device will know that it is inconvenient to use seeing that it does not allow for a natural drinking action.

It is an object of this invention to alleviate at least some of the problems experienced with existing purification devices.

It is a further object of this invention to provide a purification device that will be a useful alternative to existing purification devices.

SUMMARY OF THE INVENTION

In accordance with a first aspect of the invention there is provided a fluid purification device including:

a container having at least partially flexible sidewalls so that it is collapsible from a first, operative condition into a second, inoperative condition;

a nozzle which is connectable to the container, the nozzle defining a first fluid flow path along which fluid flows when, in use, filling the container and a second fluid flow path along which fluid flows when, in use, dispensing fluid from the container; and a removable filter element which is carried by the nozzle such that it is positioned in the first fluid flow path so that the fluid is filtered when filling the container and positioned outside the second fluid flow path so that the flow of fluid is unobstructed by it when dispensing fluid from the container.

The nozzle may include an outer, annular rim forming a drinking spout to drink from the container and an inner, annular rim forming a filter holder for carrying the removable filter element.

The filter holder preferably defines a fluid receiving passage forming part of the first fluid flow path in which the filer element is located when being carried by the filter holder, thereby filtering the fluid through the filter element when filling the container.

The filter holder preferably has a funnel shaped first portion, which is in use its upper portion, and a second portion, which is in use its lower portion, carrying the filter element.

In one embodiment the device includes a removable filter retaining member defining the funnel shaped portion.

The funnel shaped portion may be at least partially deformable so as to create a fluid tight seal between it and an outlet of a fluid source when pressed against the outlet while filling the container.

The filter retaining member may be made from a first, substantially rigid material at least a portion of which is covered by a second material. Preferably, the second material is softer than the first material.

In one embodiment, the funnel shaped first portion is covered by the second material.

In another embodiment the funnel shaped upper portion may be formed by a thin-walled sidewall so that it is allowed to deform under pressure. In this embodiment the upper portion is preferably at least partially deformable so as to create a fluid tight seal between it and an outlet of a fluid source when pressed against the outlet while filling the container. At least a part of the funnel shaped upper portion may be made from an elastic material, preferably an elastomeric material.

A chamber may located between the filter element and the lower portion to allow fluid to be distributed evenly over substantially the entire surface of the filter element, thereby allowing substantially the entire surface area of the filter element to be used when filtering the fluid while filling the container.

In the preferred embodiment the outer and inner rims define a fluid dispensing passage between them, the fluid dispensing passage forming part of the second fluid flow path along which fluid is dispensed from the container.

In one embodiment of the invention the inner rim is removably connectable to the outer rim. In this embodiment the inner and outer rims are connected to one another by means of complementary shaped retaining formations. Preferably, each retaining formation includes a flange carrying a number of annularly spaced apart openings are formed to dispense fluid form the container.

In another embodiment the inner and outer rims are integrally formed. In this embodiment the inner and outer rims are connected to each other by bridges extending between the inner and outer rims.

The outer rim and the container may carry complementary shaped connecting formations for connecting the nozzle to the container. The connecting formations preferably create a snap-fit connection. Alternatively, the connecting formations may create a threaded connection.

In accordance with a second aspect of the invention there is provided a nozzle for a fluid purification device including a container, the nozzle including a spout which is used to drink from the container and a filter holder for carrying a removable filter element, wherein the nozzle defines a first fluid flow path along which fluid flows when, in use, filling the container and a second fluid flow path along which fluid flows when, in use, dispensing fluid from the container, wherein the fluid flow paths are arranged such that, when located in the nozzle, the removable filter element is positioned in the first fluid flow path so that the fluid is filtered when filling the container and positioned outside the second fluid flow path so that the flow of fluid is unobstructed by it when dispensing fluid from the container.

The filter holder may have a fluid receiving passage forming part of the first fluid flow path in which the filer element is located when being carried by the filter holder, thereby filtering the fluid through the filter element when filling the container.

The filter holder preferably has a funnel shaped first portion, which is in use its upper portion, and a second portion, which is in use its lower portion, carrying the filter element.

The device preferably has a removable filter retaining member defining the funnel shaped portion.

The funnel shaped upper portion may be formed by a thin-walled sidewall so that it is allowed to deform under pressure.

The upper portion is preferably at least partially deformable so as to create a fluid tight seal between it and an outlet of a fluid source when pressed against the outlet while filling the container. Preferably, at least a part of the funnel shaped upper portion is made from an elastic material, such as an elastomeric material for example.

The spout and filter holder may define a fluid dispensing passage between them, the fluid dispensing passage forming part of the second fluid flow path along which fluid is dispensed from the container.

The filter holder may be removably connectable to the spout by means of complementary shaped retaining formations. Each retaining formation preferably includes a flange carrying a number of annularly spaced apart openings are formed to dispense fluid form the container.

In another embodiment the filter holder and spout are integrally formed and connected to each other by bridges extending between the spout and filter holder.

The spout may carry connecting formations for connecting the nozzle to the container.

In one embodiment the nozzle has a removable cap which may be connectable to the filter holder.

In accordance with a third aspect of the invention there is provided a method of filtering a fluid, the method including the following steps:
  providing a container;
  connecting a nozzle to the container;
  providing a filtering element in a first fluid flow path through the nozzle;
  filling the container through the first fluid flow path;
  filtering the fluid flowing along the first fluid flow path;
  dispensing fluid from the container through a second fluid flow path of the nozzle which bypasses the filtering element.

The step of filling the container may include pressing the nozzle against an outlet of a fluid source so as to create a seal between the nozzle and the outlet, thereby preventing fluid from escaping while filling the container.

The method may include deforming the nozzle when pressing it against the outlet of the fluid source so as to improve the integrity of the seal created between the nozzle and the outlet while filling the container.

The method may further include filtering the fluid though substantially the entire surface area of the filtering element.

The method may also include providing a filtering chamber located above the filtering element when filtering the fluid.

Preferably, the second fluid flow path runs between a filter holder carrying the filtering element and a spout used to drink from the container. In the preferred embodiment the second fluid flow path is substantially unobstructed to allow free flowing of fluid while dispensing fluid from the container, thereby allowing a natural drinking action.

The method may include expanding the container from a collapsed state, preferably prior to filling the container.

The method may also include collapsing the container after dispensing fluid therefrom.

BRIEF DESCRIPTION OF THE DRAWINGS

The invention will now be described in more detail, by way of example only, with reference to the accompanying drawings in which.

DESCRIPTION OF THE ILLUSTRATED EMBODIMENT

Figure 1:
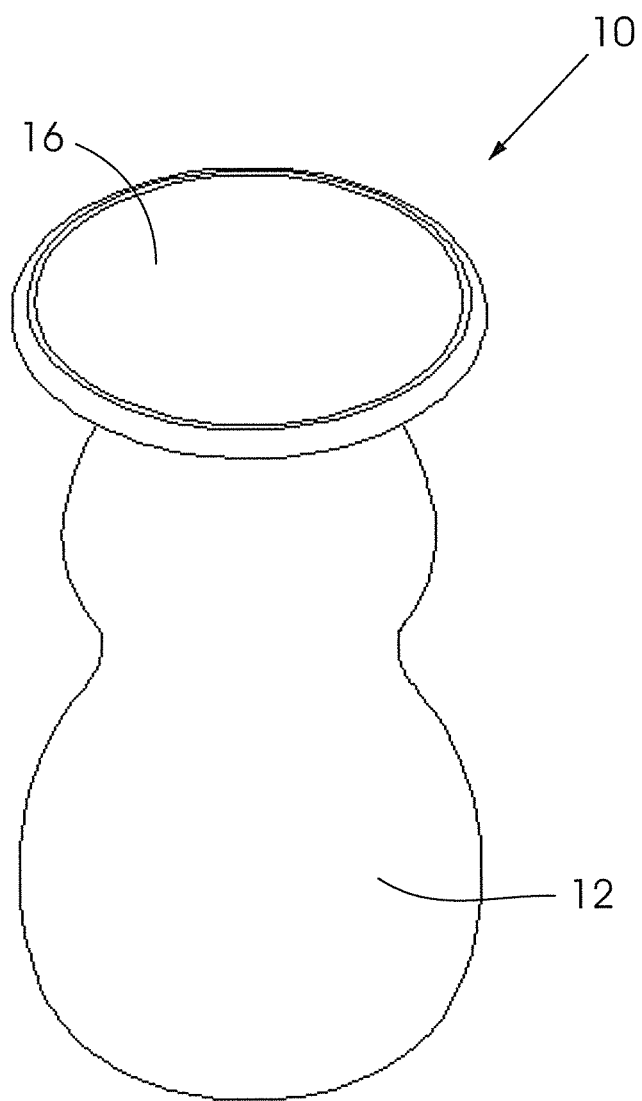
FIG. 1 shows a perspective view of a purification device in accordance with a first embodiment of the invention wherein a container of the device is in a first, operative state.

Referring to the drawings, in which like numerals indicate like features, a non-limiting example of a purification device in accordance with a first embodiment of the invention is generally indicated by reference numeral 10. The purification device 10 is illustrated in FIGS. 1 to 9.

In the accompanying drawings the purification device 10 is illustrated as a bottle which includes a body in the form of a container 12, a nozzle 14 for dispensing fluid from the container and a closure or cap 16 for closing off the nozzle when not in use.

Figure 8:
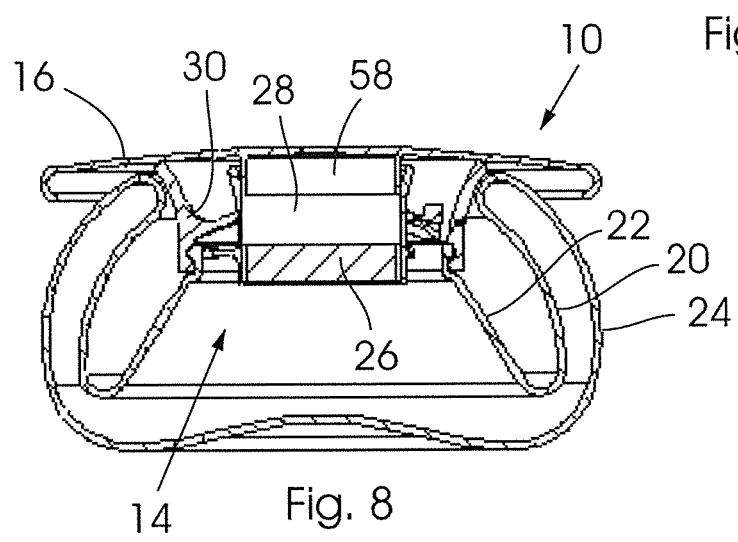
FIG. 8 shows a cross-sectional view of the device of FIG. 6 taken along B-B as shown in FIG. 7.
Figure 9:
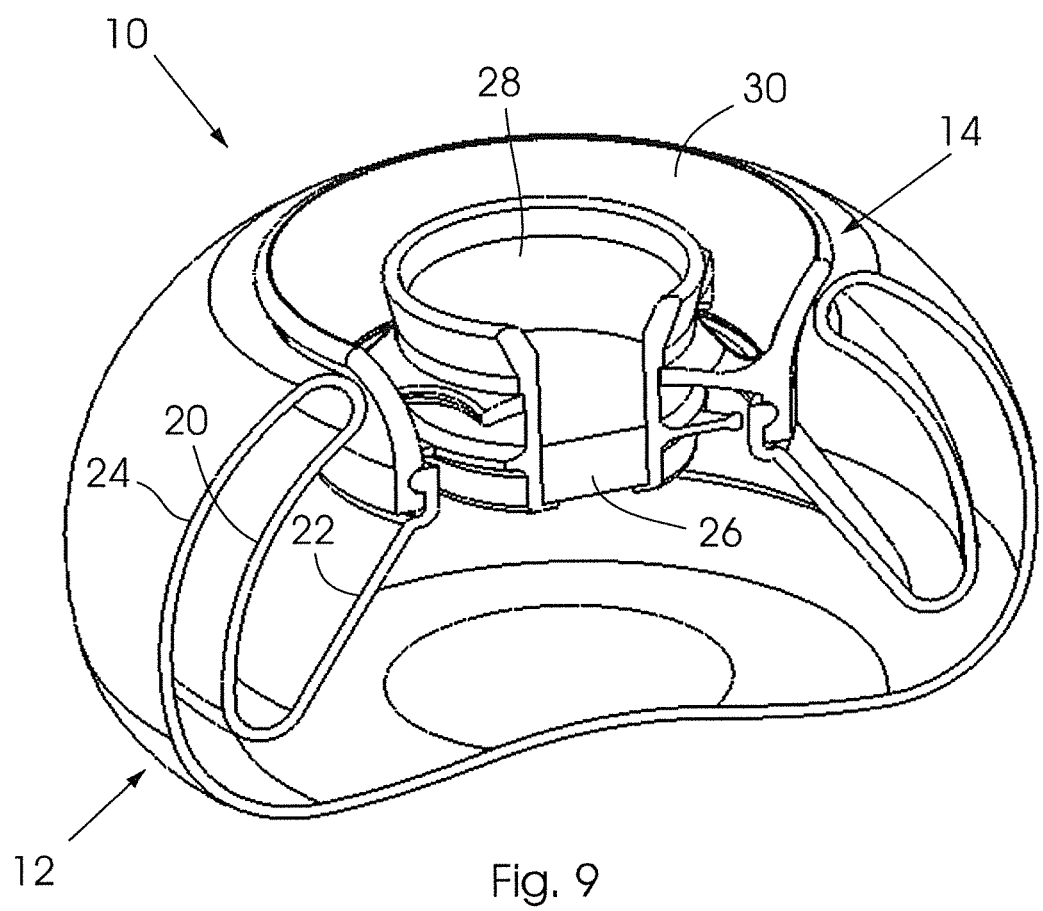
FIG. 9 shows a cross-sectional perspective view of the device of FIG. 6 in its inoperative state wherein its cap is removed.

In the preferred embodiment of the device 10 its sidewall is at least partially flexible so as to allow the bottle to be collapsible from a first, operative state into a second, inoperative state. The bottle 12 is shown in its operative state in FIGS. 1 to 5 and in its inoperative state in FIGS. 6 to 9. From these figures it can be seen that the flexible sidewall allows the container 12 to collapse along its axial centreline 18 when compressing it from its operative state into its inoperative state. To allow for this actual compression of the container 12, the rigidity or stiffness of the sidewall is varied between different zones which are spaced apart along the longitudinal length of the container, i.e. along its axial centreline 18. In the preferred embodiment of the container 12 the stiffness of the sidewall in a central portion or zone 20 is reduced in comparison to the stiffness of the sidewall in an upper portion or zone 22 and base portion or zone 24. It should be understood that this variation in stiffness along the longitudinal length of the sidewall creates an area of weakness in the central zone 20, thereby allowing the sidewall to collapse when the bottle is compressed along the axial centreline 18. Probably best seen and FIG. 3 the container 12 is shaped so that the diametrical width $D_C$ in a central region 20 is reduced in comparison to the diametrical widths $D_B$ in the base region 24 and $D_U$ in the upper region 22. As a result of the substantial reduction in diameter in the central region 20 the sidewall in this central region folds inwardly into the base portion 24 when the container 12 is compressed into its inoperative position. As is seen in FIGS. 8 and 9, the sidewall of the container 12 in the upper region 22 is located completely within the base region 24 of a container when in its inoperative state, thereby significantly reducing the axial length of the container.

It is envisaged that it will be more convenient for a user to travel with the bottle 10 when in its collapsed state as it takes up less space in comparison to its operative state. A user will then simply pull the container along the centreline 18 to move it from its inoperative state into its operative state wherein it can be filed with a fluid, such as water for example. The container 12 is filled by pouring water through the nozzle 14 which carries a removable filter element 26 for filtering the water.

Figure 5:
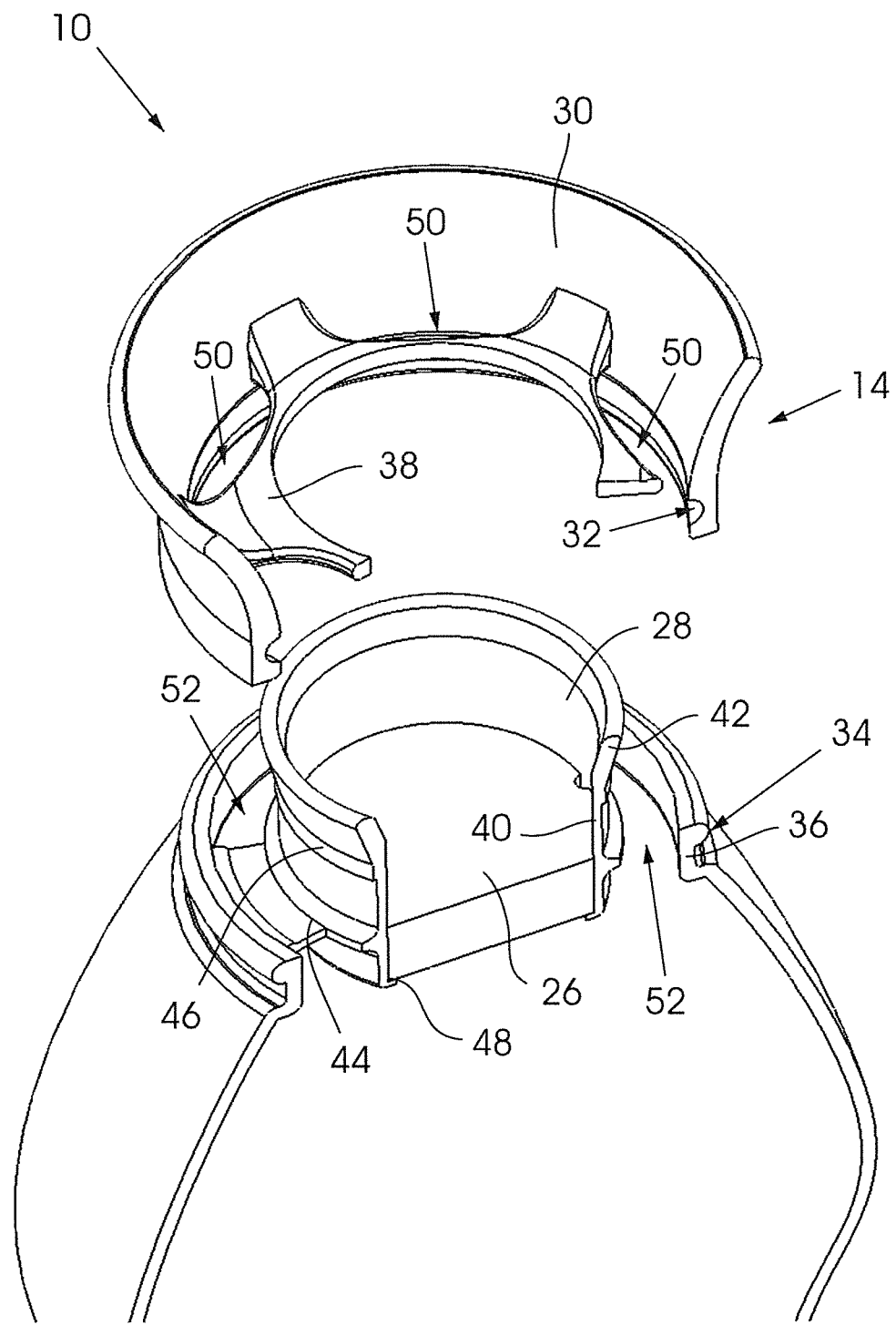
FIG. 5 shows an enlarged, exploded perspective view of a nozzle of the device in cross-section.
Figure 6:
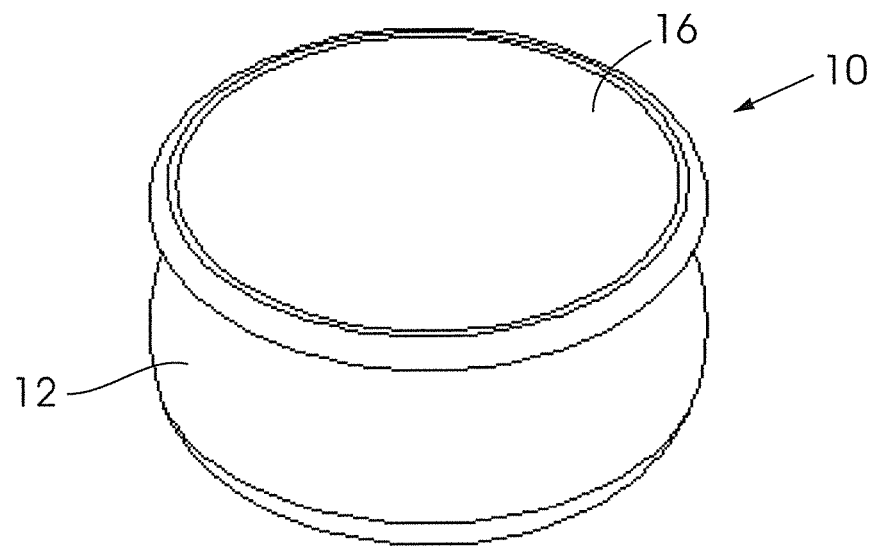
FIG. 6 shows a perspective view of the purification device of FIG. 1 wherein the container is in a second, inoperative state.
Figure 7:
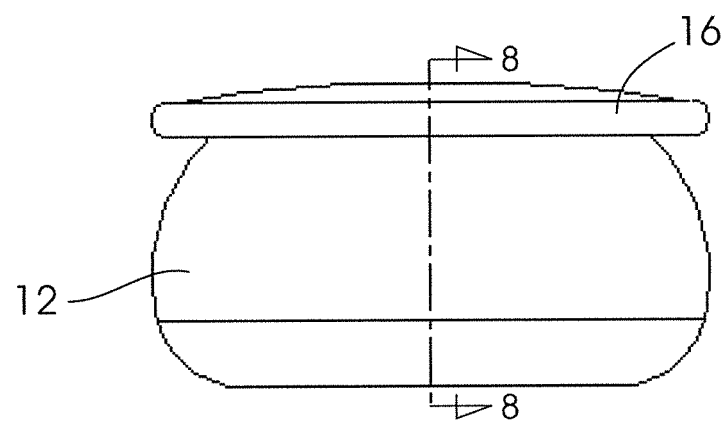
FIG. 7 shows a front view of the device of FIG. 6 in its inoperative state.

The nozzle 14 includes an outer rim which forms a drinking spout 30 and an inner rim or filter holder 28. The filter element 26 is removably carried by the filter holder 28 which is, in turn, removably carried by the spout 30. This connecting arrangement is illustrated in FIG. 5 which shows an enlarged exploded view of the nozzle 14 in cross-section. From this figure it can be seen that the spout 30 has connecting means 32 for connecting the spout to complementary shaped connecting means 34 carried by a rim 36 of the container 12. In the illustrated embodiment of the device 10 the connecting means 34 of the container 12 is in the form of a ridge projecting from the annular rim 36. The connecting means 32 on the spout 30 is, in turn, in the form of an annular recess in which the ridge 34 is received when connecting the spout to the container. It should be understood that the ridge 34 and recess 32 create a snap-fit connection between the spout 30 and container 12 for easy and convenient connection between the nozzle and container.

Figure 4:
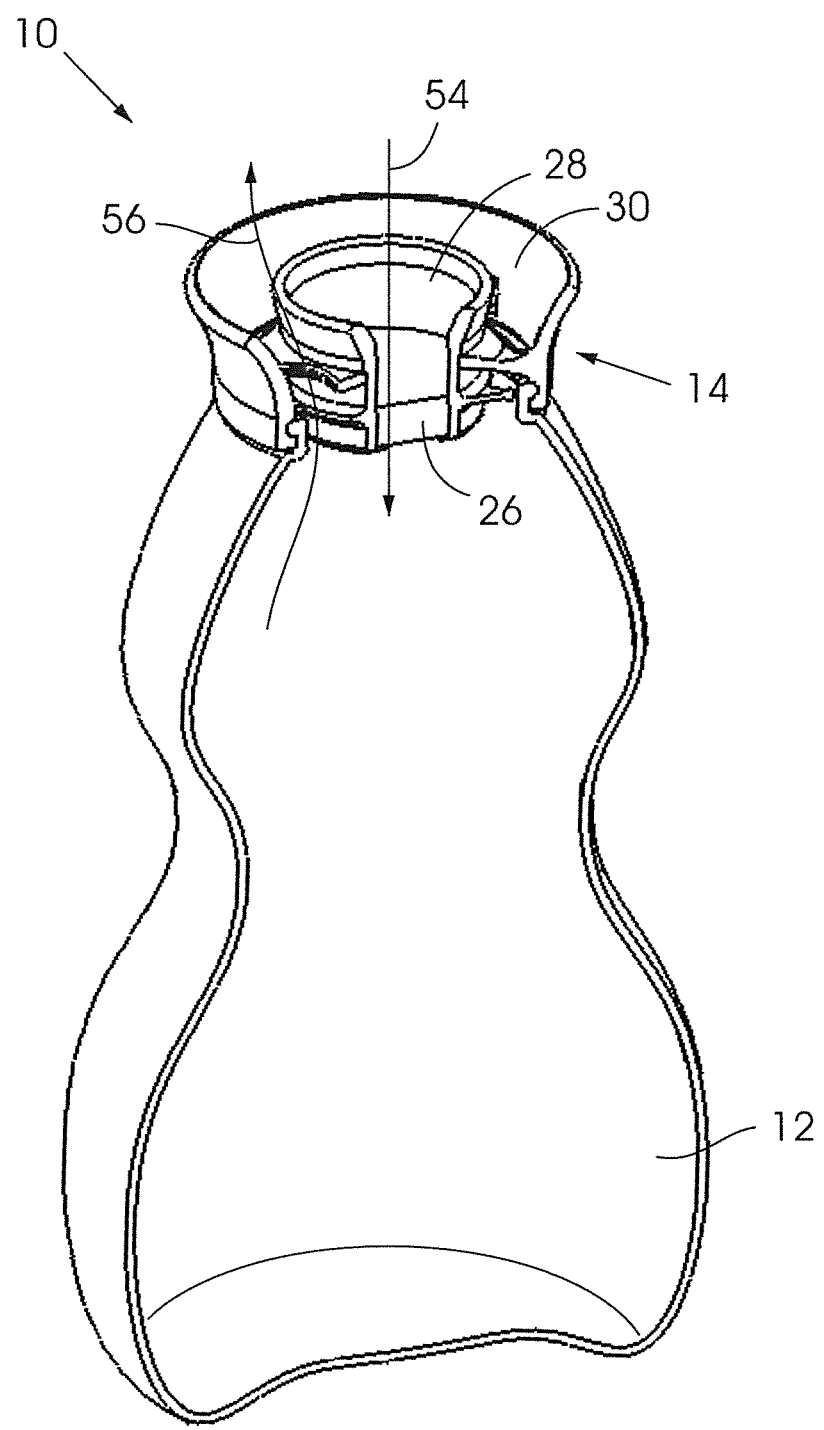
FIG. 4 shows a cross-sectional perspective view of the device of FIG. 1 wherein its cap is removed.

Referring still to FIG. 5, the spout 30 has an internal flange 38 which acts as a retaining formation for the filter holder 28. The filter holder 28 has a substantially cylindrical body 14 which has a flared end 42 at its end which is, in use, its upper end. A flange 44 and brim 46 protrude outwardly from the body 40 of the filter holder 28 and are axially spaced apart so as to receive the retaining formation 38 of the spout 30 between them when the filter holder is carried by the spout. As is seen in FIG. 4 the filter holder 28 is typically carried by the spout 30 in a position wherein the brim 46 abuts the retaining formation 38. It should be clear that the retaining formation 38 carries a central hole in which the filter holder 28 is, in use, located. The hole in the retaining formation 38 is dimensioned so that the brim 46 holds the filter holder 28 captive.

The filter holder 28 has an internal lip which acts as a stop for locating the filter element 26 in the holder. The lip 48 is shaped to receive the filter element 26 in an axial direction from the end of the body 40 which is, in use, its upper end. In other words, the filter element is inserted from the upper end of the filter holder 28 until it abuts the lip 48, which prevents any further downward movement of the filter element.

The internal flange 38 of the spout 30 and the external flange 44 of the filter holder 28 carry openings through which water is allowed to flow when dispensing water from the container 12. In the accompanying drawings the openings in the internal flange 38 are indicated by the numeral 50 while the openings in the external flange 44 are indicated by the numeral 52. There are five openings 50, 52 in the flanges 38 and 44 respectively. The openings 50, 52 are circumferentially evenly spaced apart.

Referring now in particular to FIG. 4, the nozzle 14 defines a first fluid flow path 54 along which fluid flows when filling the container 12 and a second fluid flow path 56 along which fluid flows when dispensing water from the container. The first fluid flow path 54 runs substantially straight through the cylindrical body 40 of the filter holder 28 so that the filter element 26 is positioned in the first fluid flow path, thereby filtering the water when filling the container 12. The second fluid flow path 56, in turn, runs substantially along the contours of the sidewall of the container 12 and through the openings 50 and 52 in the nozzle 14. The filter element 26 is accordingly positioned outside the second fluid flow path 56 so that the flow of water is unobstructed by it when dispensing water from the container 12. It should be understood that the second fluid flow path 56 provides substantially unobstructed flow of water from the container to allow for a natural drinking action in drinking water directly from the bottle.

In the preferred embodiment of the bottle 10 the filter holder 28 is freely rotatable inside the spout 30 so as to allow for an adjustment in flow rate when dispensing water from the container 12. By rotating the filter holder 26 about the centre axis 18 the alignment between the holes 50 in the spout 30 and the holes 52 in the container holder 28 are adjusted, thereby changing the size of the aligned opening between the spout and container holder through which water is dispensed. From the above description it is clear that the bottle 10 allows for a controlled water flow rate when dispensing water from the container 12.

Figures 2, 3:
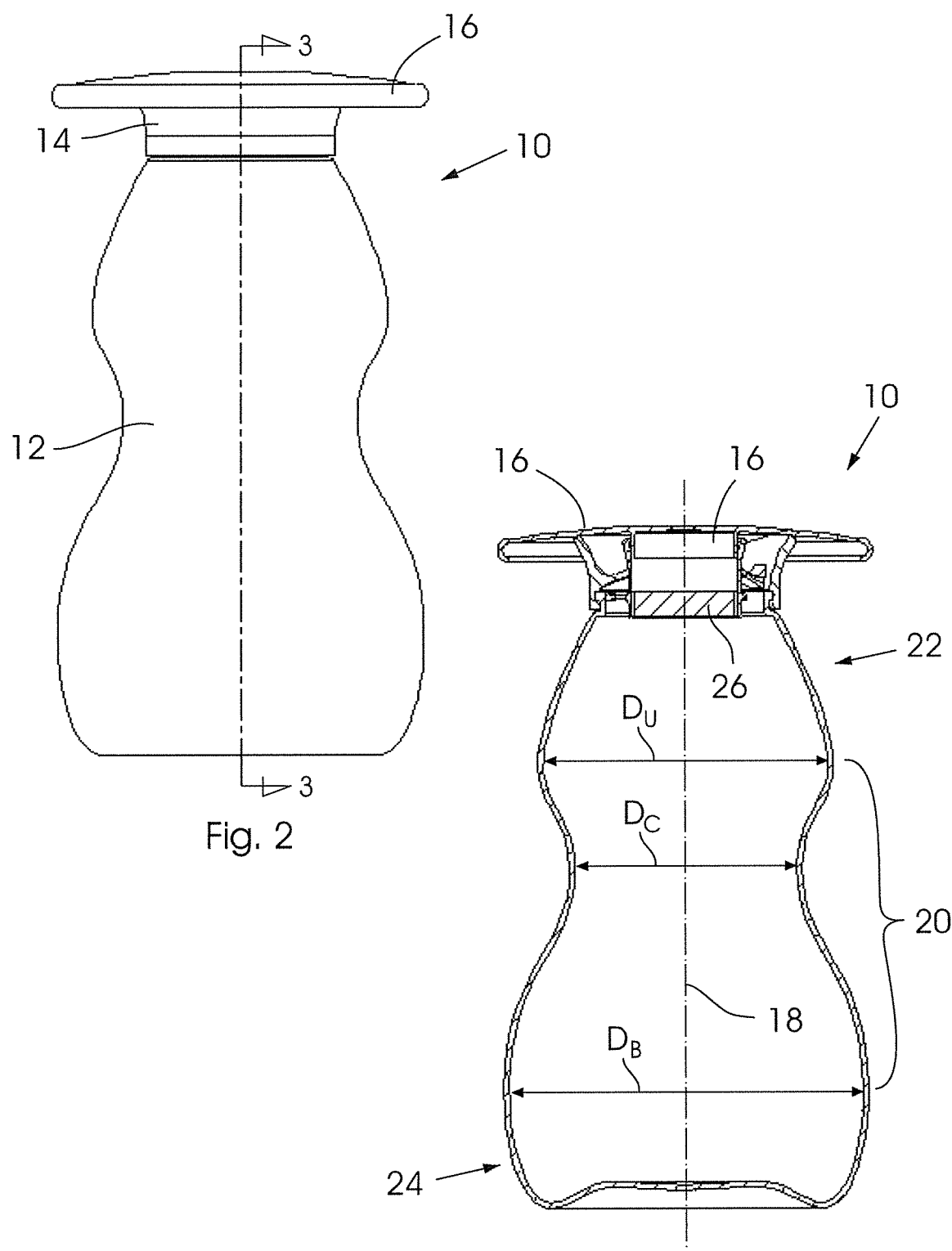
FIG. 2 shows a front view of the device of FIG. 1.
FIG. 3 shows a cross-sectional view of the device of FIG. 1 taken along A-A as shown in the FIG. 2.

Returning now to the closure 16 of the bottle 10, it can be seen from FIGS. 3 and 8 that the closure carries a retaining formation 58 on a surface which is, in use an internal surface. The retaining formation 58 is in the form of an annular rim protruding from the internal surface for connection to the body 40 of the filter holder 28. As shown in FIGS. 3 and 8 the annular rim 58 is received in the flared end 42 of the body 40 of the filter holder 28. The annular rim 58 is dimensioned to create a press fit with the body 40, thereby ensuring that the closure 16 is retained in the nozzle 14 when the annular rim 58 engages the body 40 of the filter holder 28. The press fit between the closure 16 and nozzle 14 eliminate the need for any external fastener to secure the closure on the nozzle.

The method of filtering fluid by using the bottle 10 and dispensing fluid from the bottle should be apparent from the above description and will therefore not be described again in any detail.

Referring now to FIGS. 10 to 14 of the drawings, a non-limiting example of a purification device in accordance with a second embodiment of the invention is generally indicated by reference numeral 100. Again, like numerals indicate like features.

Similarly to the first embodiment of the device, the device 100 is in the form of a bottle which includes a body, in the form of a container, and a nozzle for dispensing fluid from the container. The body or container of the device 100 is substantially similar to that of the first embodiment 10 and will therefore not be described in detail again. However, the design of the nozzle of the device 100 is different to that of the first embodiment 10 and is accordingly described in detail below.

Figure 10:
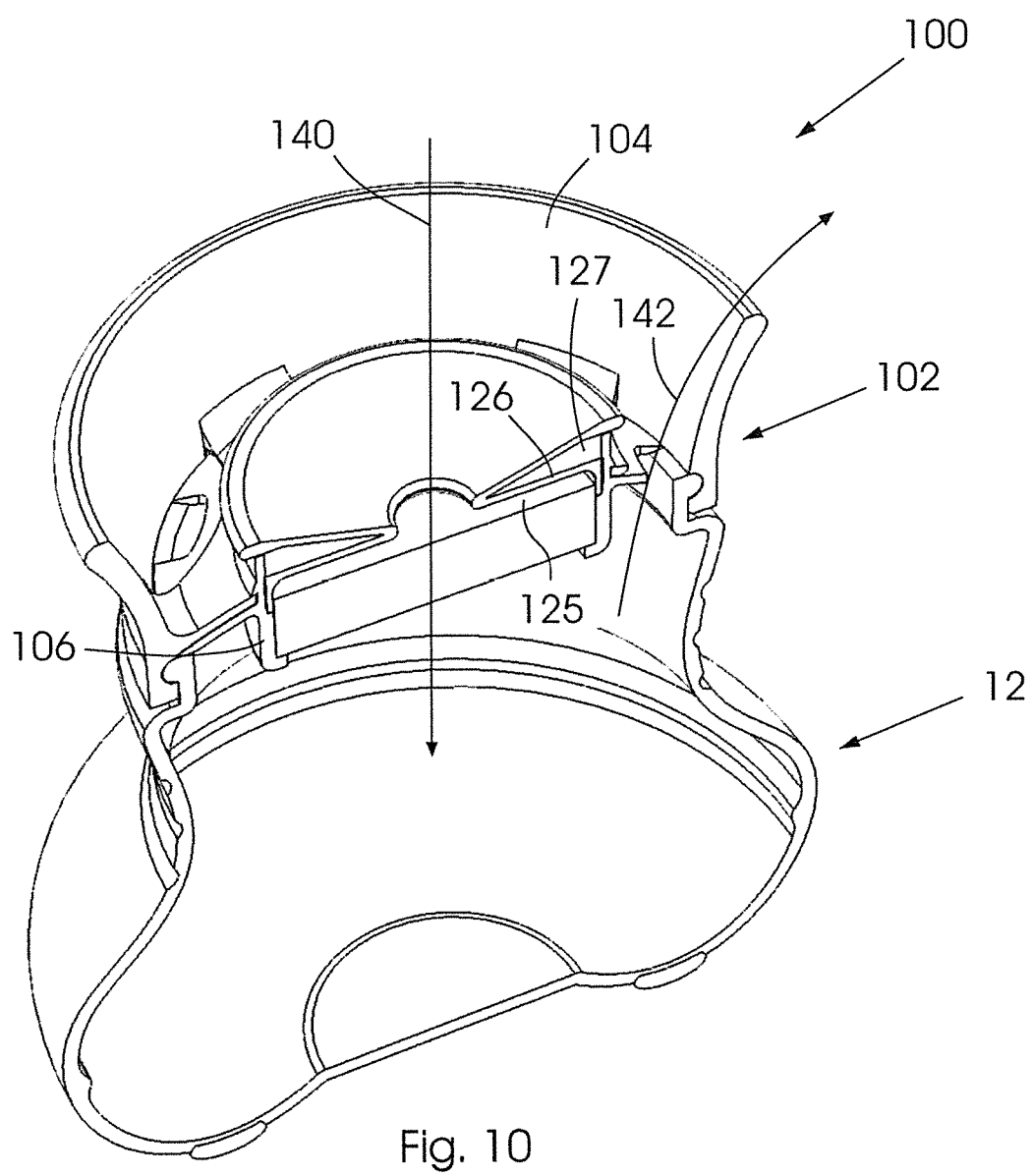
FIG. 10 shows a cross-sectional perspective view of a purification device in accordance with a second embodiment of the invention.
Figure 11:
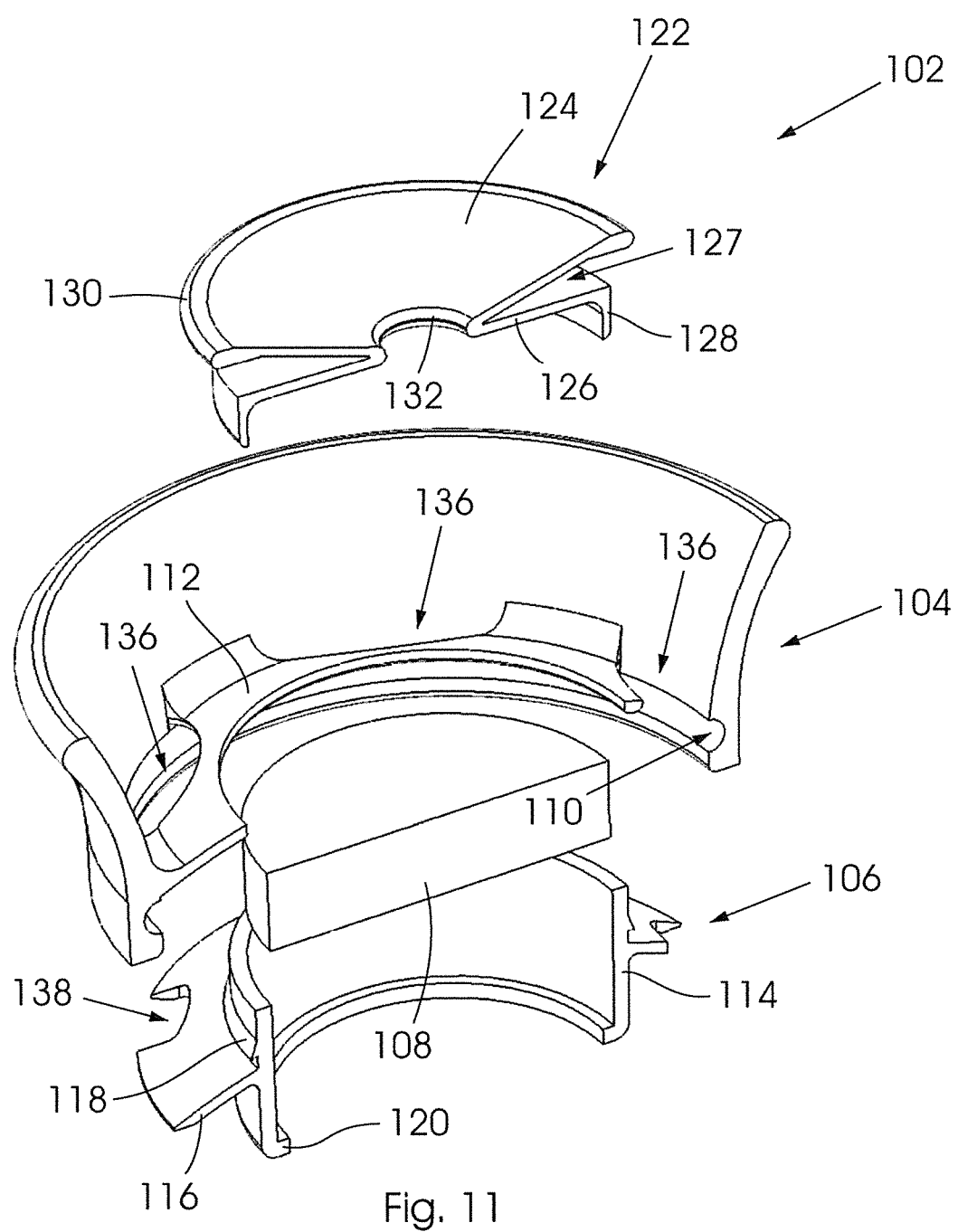
FIG. 11 shows an enlarged, exploded perspective view of a nozzle of the device of FIG. 10 in cross-section.

In FIGS. 10 to 14 the nozzle is indicated by the numeral 102. The nozzle 102 includes an outer rim which forms a drinking spout 104 and an inner rim or filter holder 106. A filtering element 108 is again removably carried by the filter holder 106 which is, in turn, removably carried by the spout 104. This connecting arrangement is best illustrated in FIG. 11 which shows an enlarged exploded view of the nozzle 102 in cross-section. From this figure it can be seen that the spout 104 has connecting means 110 for connecting the spout to complementary shaped connecting means 34 carried by a rim 36 of the container 12. In this second embodiment 100 the connecting means 34 is again in the form of a ridge projecting from the annular rim 36. The connecting formation 110 on the spout 104 is again in the form of an annular recess in which the ridge 34 is received when connecting the spout to the container. It should be understood that the ridge 34 and recess 110 create a snap-fit connection between the spout 102 and container 12 for easy and convenient connection between the nozzle and container.

Referring still to FIG. 11, the spout 104 has an internal flange 112 which acts as a retaining formation for the filter holder 106. The filter holder 28 has a substantially cylindrical body 114 from which a flange 116 and brim 118 protrude radially outwardly. The flange 116 and brim 118 create a retaining formation which is complementary shaped to the retaining formation 112 for allowing engagement between the retaining formations.

The flange 116 and brim 118 are axially spaced apart so as to receive the retaining formation 112 of the spout 104 between them when the filter holder 106 is carried by the spout. As seen in FIG. 10, the filter holder 106 is typically carried by the spout 104 in a position wherein a portion of the retaining formation 112 is held captive between the flange 116 and the brim 118, thereby obstructing movement of the filter holder 106 in an axial direction i.e. a direction of movement along the axis 18. Similarly to the first embodiment 10 the retaining formation 112 of the spout 104 carries a central hole in which the filter holder 106 is, in use, located.

The filter holder 106 has an internal lip 120 which acts as a stop for locating the filter element 108 in the holder. The lip 120 is shaped to receive the filter element 108 in an axial direction from the end of the device 10 which is, in use, its upper end. In other words, the filter element is inserted from the upper end of the filter holder 106 until it abuts the lip 120, which prevents any further downward movement of the filter element.

Unlike the first embodiment of the device 10, the nozzle 102 of the second embodiment 100 includes a removable filter retaining member 122. Probably best seen in FIG. 11, the filter retaining member 122 has a funnel-shaped first portion 124 which is, in use, its upper portion and a circular second portion 126 which is, in use, its lower portion. The lower portion 126 carries an annular rim 128 which is received in the filter holder 106 when the retaining member 122 is attached to the filter holder 114 so as to retain the filter element 108 inside the filter holder 106. In FIG. 10 it can be seen that the retaining member 122 closes off the open, upper end of the filter holder 106 through which the filter element is received. The annular rim 128 and the body 114 of the filter holder 106 are dimensioned so as to create a tight fit or press fit connection between them in order to retain the retaining member 122 on the filter holder 106 when they engage one another.

Referring still to FIG. 11 it can be seen that the funnel-shaped upper portion 124 has a larger end 130 which forms the circular, upper end of the retaining member 122 and a smaller, lower end 132 terminating at a central hole 134 running axially through the retaining member. The larger, upper end 130 has a diameter larger than that of the upper end of the body 114 of the filter holder 106, thereby allowing the funnel-shaped portion 124 to extend radially beyond the upper end of the body 114 of the filter holder 106.

In use, when filling the container 12 the filter retaining member 122 is typically attached to the filter holder 106 such that its funnel-shaped upper portion 124 can be used to fill the container. When filing the container, the funnel shaped upper portion 124 is pressed against an outlet of the water source, such as a tap, for example. By pressing the funnel shaped upper portion 124 against the outlet of the tap a seal is created to prevent water from escaping. It should be understood that, as a result of the seal created between the upper portion 124 and the tap outlet, water is forced through the central hole 132 and through the filter element 108. Probably best seen in FIGS. 10 and 12, a chamber 125 is located between the filter element 108 and the lower portion 126 of the filter retaining member 122. The chamber 125 allows water to be distributed evenly over the entire surface of the filter element 106 so as to ensure that the entire surface area of the filter element 106 is used to filter the water while filling the container 12.

It is envisaged that at least a part of the funnel shaped upper portion 124 of the filter retaining member 122 could be made from an elastic material in order to improve the quality of the seal being created when pressed against the tap outlet. The elastic material could be in the form of an elastomeric material such as Monprene®, Santoprene™ or any other thermoplastic elastomer. In use, the funnel shaped upper portion 124 deforms when pressed against the tap outlet in order to create a fluid tight seal so as to prevent any water from escaping. The fluid tight seal increases the fluid pressure in order to force the water through the filter element 106, thereby increasing the rate at which the container 12 is filled.

Figure 12:
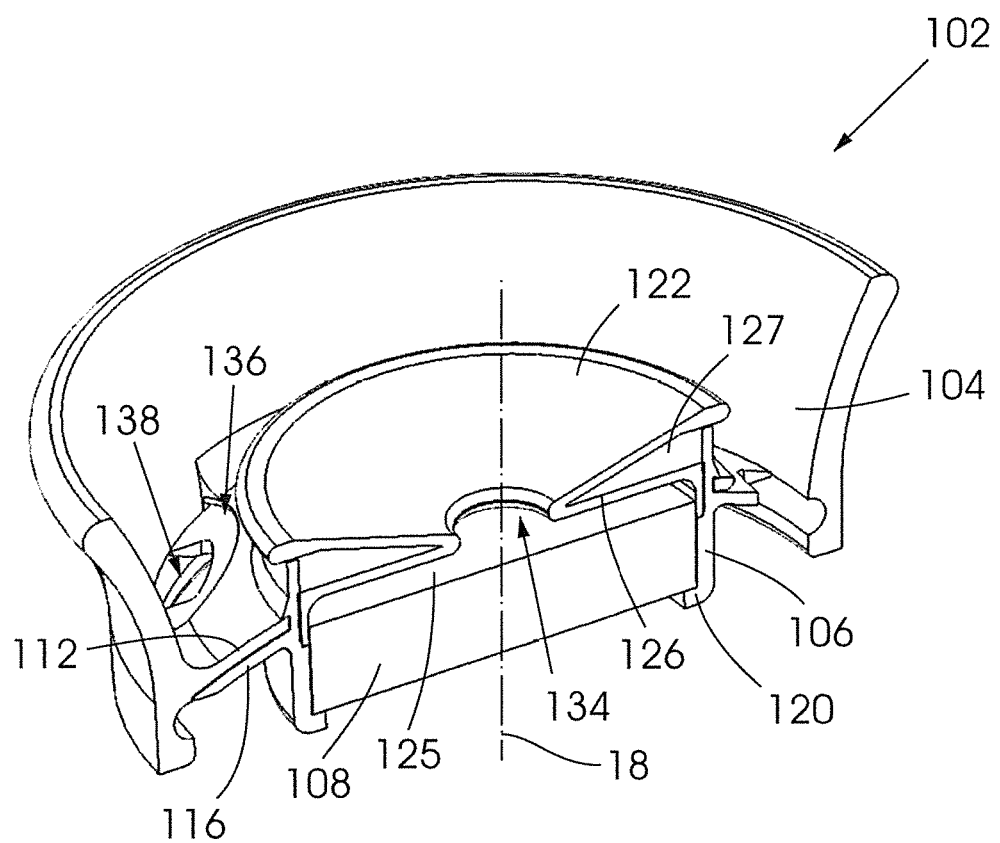
FIG. 12 shows an enlarged, assembled perspective view of the nozzle of FIG. 11.

Referring in particular to FIGS. 10 to 12, it can be seen that the upper portion 124 is formed by a thin-walled sidewall so that it is allowed to deform under pressure when forced against the tap outlet. It should be understood that the funnel shaped upper portion 124 is deformed into a V-shaped annular space 127 located between the upper portion 124 and the lower portion 126. The deformation of the sidewall forming the funnel upper portion 124 improves the integrity of the seal formed between the upper portion and the tap outlet.

In this second embodiment of the purification device 100 the funnel shaped upper portion 124 is dimensioned to allow a wide range of different sized tap outlets to be used when filling the container 12. The method of filing the container 12 as described above could be exercised using any tap of which the outlet locates between the inner and outer ends 130, 132 of the funnel shaped upper portion 124 when pressed against it.

Returning now to FIG. 11 it can be seen that the internal flange 112 of the spout 104 and the external flange 116 of the filter holder 106 carry openings through which water is allowed to flow when dispensing water from the container 12. In FIGS. 10 to 14 the openings in the internal flange 112 are indicated by the numeral 136 while the openings in the external flange 116 are indicated by the numeral 138. There are again five circumferentially spaced apart openings in each of the flanges 112 and 116.

Returning now to FIG. 10, the nozzle 102 defines a first fluid flow path 140 along which fluid flows when filling the container 12 and a second fluid flow path 142 along which fluid flows when dispensing water from the container. The first fluid flow path 140 runs substantially straight through the cylindrical body 114 of the filter holder 106 so that the filter element 108 is positioned in the first fluid flow path, thereby filtering the water when filling the container 12. The second fluid flow path 142, in turn, runs substantially along the contours of the sidewall of the container 12 and through the openings 136 and 138 in the nozzle 102. The filter element 108 is accordingly positioned outside the second fluid flow path 142 so that the flow of water is unobstructed by it when dispensing water from the container 12. It should be understood that the second fluid flow path 142 provides substantially unobstructed flow of water from the container to allow for a natural drinking action in drinking water directly from the bottle. This unobstructed or free flow of water from the container 12 also allows water to be poured from the container.

Figure 13:
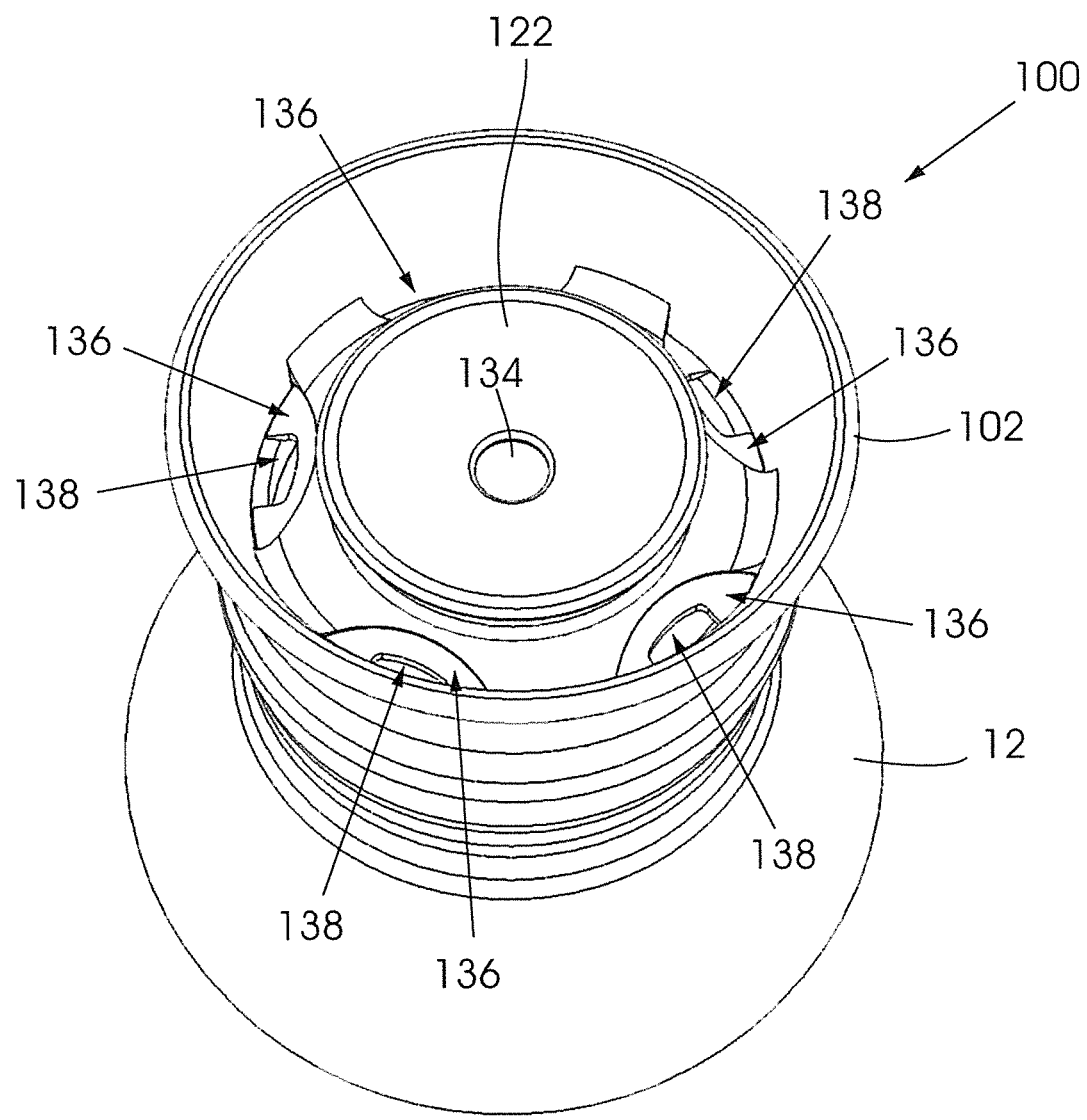
FIG. 13 shows a top perspective view of the device of FIG. 10 wherein a filter holder of the nozzle is in a first position.
Figure 14:
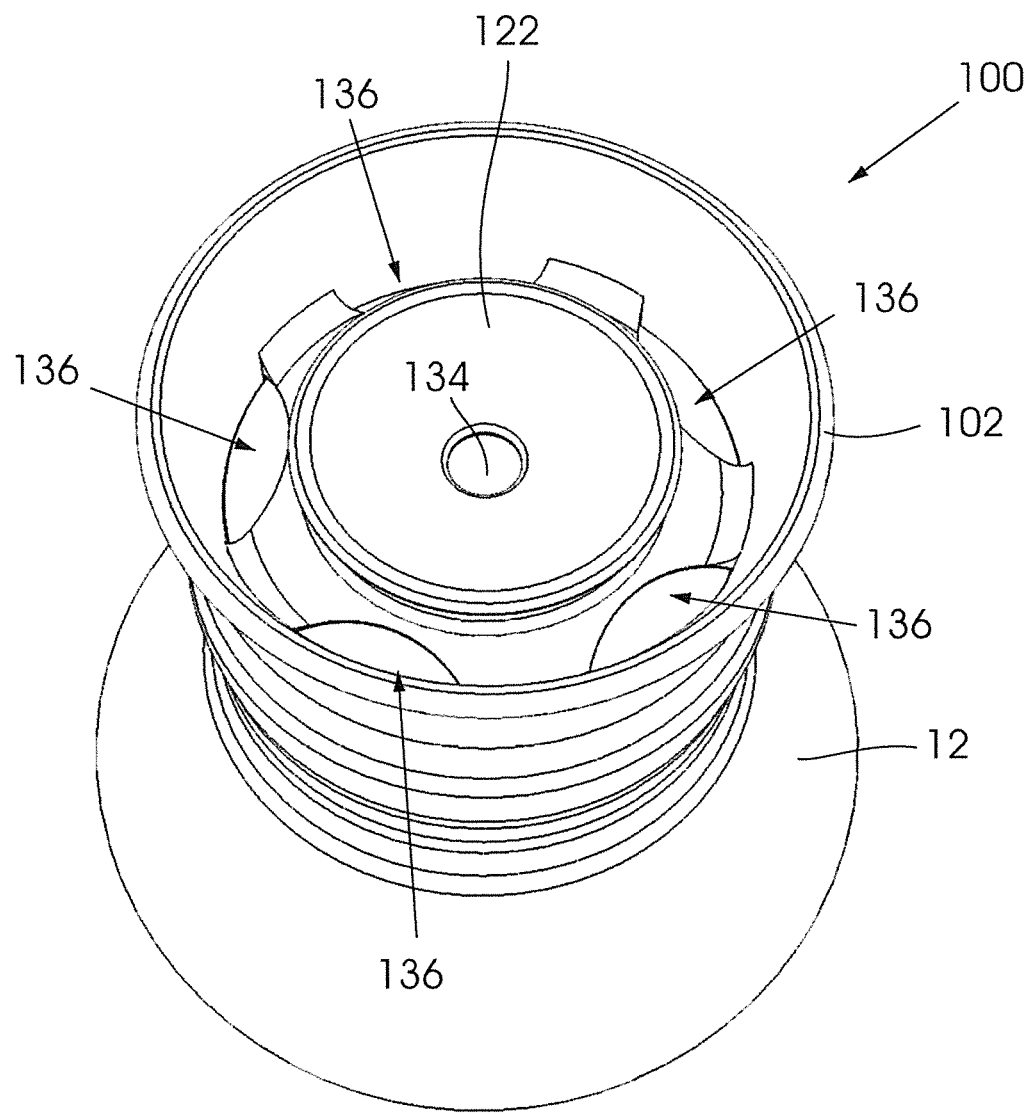
FIG. 14 shows a top perspective view of the device of FIG. 10 wherein a filter holder of the nozzle is in a second position.

Similarly to the first embodiment of the device 10, the filter holder 106 is freely rotatable inside the spout 104 so as to allow for an adjustment in flow rate when dispensing water from the container 12. By rotating the filter holder 106 about the centre axis 18 the alignment between the holes 136 in the spout 104 and the holes 138 in the container holder 106 are adjusted, thereby changing the size of the aligned opening between the spout and container holder through which water is dispensed. The filter holder 106 is shown in two different positions in FIGS. 13 and 14. In FIG. 13 the filter holder 106 is shown in a first position wherein its openings 138 are aligned with the openings 136 in the spout 104, thereby allowing water to be dispensed through the nozzle 102. In FIG. 14, on the other hand, the filter holder 106 is shown in a second position wherein its openings 138 not aligned with the openings 136 in the spout 104, thereby obstructing water from being dispensed through the nozzle 104. The bottle 100 in accordance with the second embodiment therefore also allows for a controlled water flow rate when dispensing water from its container 12.

Although not shown in the accompanying drawings it is envisaged that the device 100 could also include a removable closure. However, unlike the device 10 in accordance with the first embodiment of the invention, the closure of the device 100 would not carry a retaining formation for retaining the filter element 108 in the filter holder 106.

The method of filtering fluid by using the bottle 100 and dispensing fluid from the bottle should be apparent from the above description and will therefore not be described again in any detail.

Referring now to FIGS. 15 to 20 of the drawings, yet another non-limiting example of a purification device in accordance with a third embodiment of the invention is generally indicated by reference numeral 200. Again, like numerals indicate like features.

Similarly to the first and second embodiments of the device, the device 200 is in the form of a bottle which includes a body, in the form of a container, and a nozzle for dispensing fluid from the container. The body or container of the device 200 is substantially similar to that of the first embodiment 10 and will therefore not be described in detail again. However, the design of the nozzle of the device 200 is different to that of the first and second embodiments 10, 100 and is accordingly described in detail below.

In FIGS. 15 to 20 the nozzle is indicated by the numeral 202. The nozzle 202 again includes an outer rim 204 which forms a drinking spout and an inner rim 206, which is also referred to as a filter holder. A filtering element 208 is again removably carried by the filter holder 206. Best seen in FIGS. 15 and 16, the spout 204 again carries connecting means 210 for connecting the spout to complementary shaped connecting means 34 carried by a rim 36 of the container 12. The connecting means are substantially similar to that of the second embodiments of the device 100 and will therefore not be described again.

In this third embodiment of the device 200, the filter holder 206 is integrally formed with the spout 204. Probably best seen in FIG. 16, the inner 206 and outer 204 rims are integrally formed and connected to one another by means of connecting arrangements 212. These connecting arrangements 212 are formed as flanges or bridges extending between the inner 206 and outer 204 rims. It is envisaged that these inner rim 206, outer rim 204 and connecting arrangements 212 could be integrally formed, in particular moulded from a plastics material, for example.

The filter holder 206 again has a substantially cylindrical body 214 carrying an internal lip 216 which acts as a stop for locating the filter element 208 in the filter holder. The lip 216 is shaped to receive the filter element 208 in an axial direction from the end of the device 200 which is, in use, its upper end. In other words, the filter element 208 is inserted from the upper end of the filter holder 206 until it abuts the lip 216, which prevents any further downward movement of the filter element.

Figure 15:
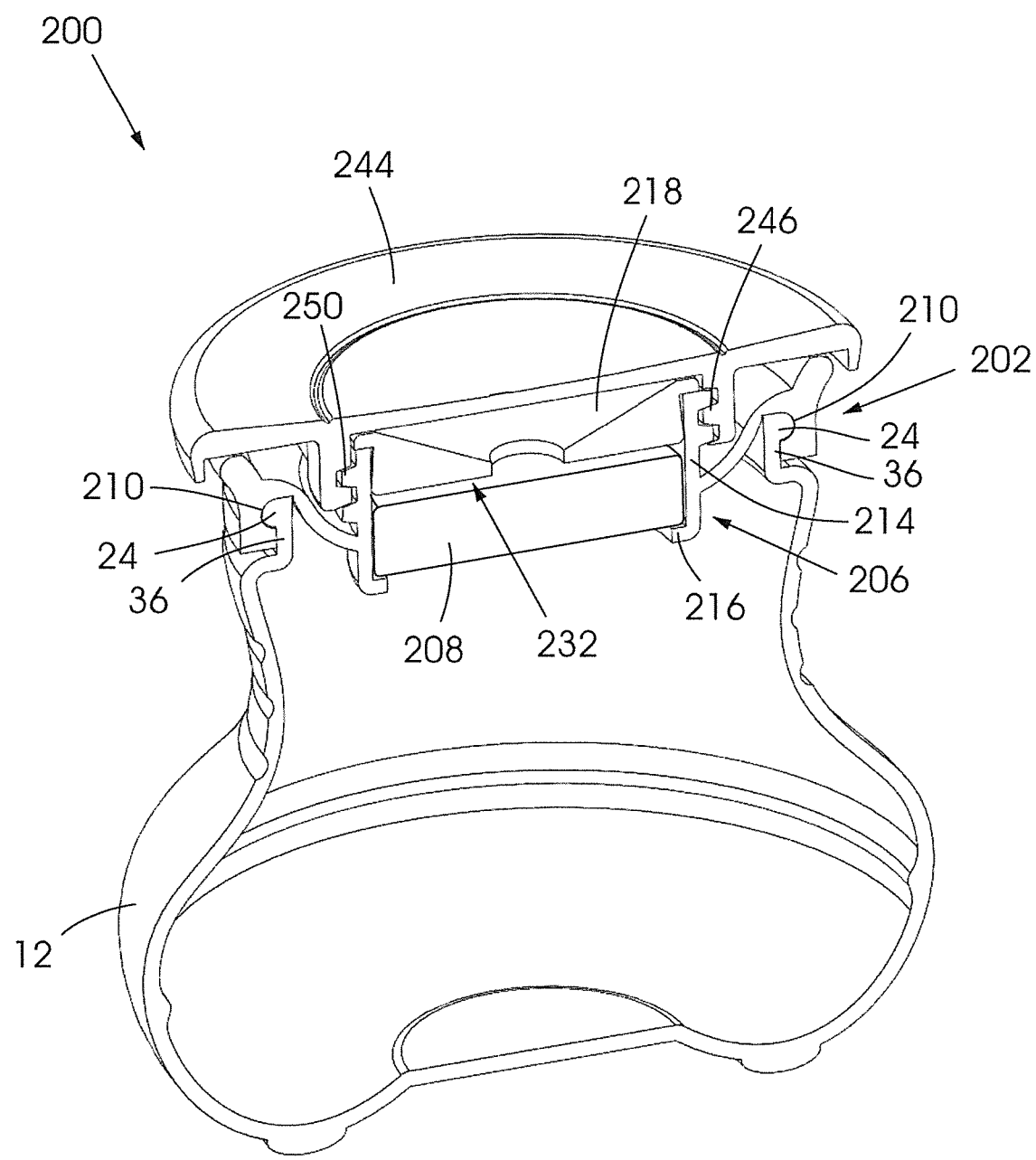
FIG. 15 shows a cross-sectional perspective view of a purification device in accordance with a third embodiment of the invention.
Figure 16:
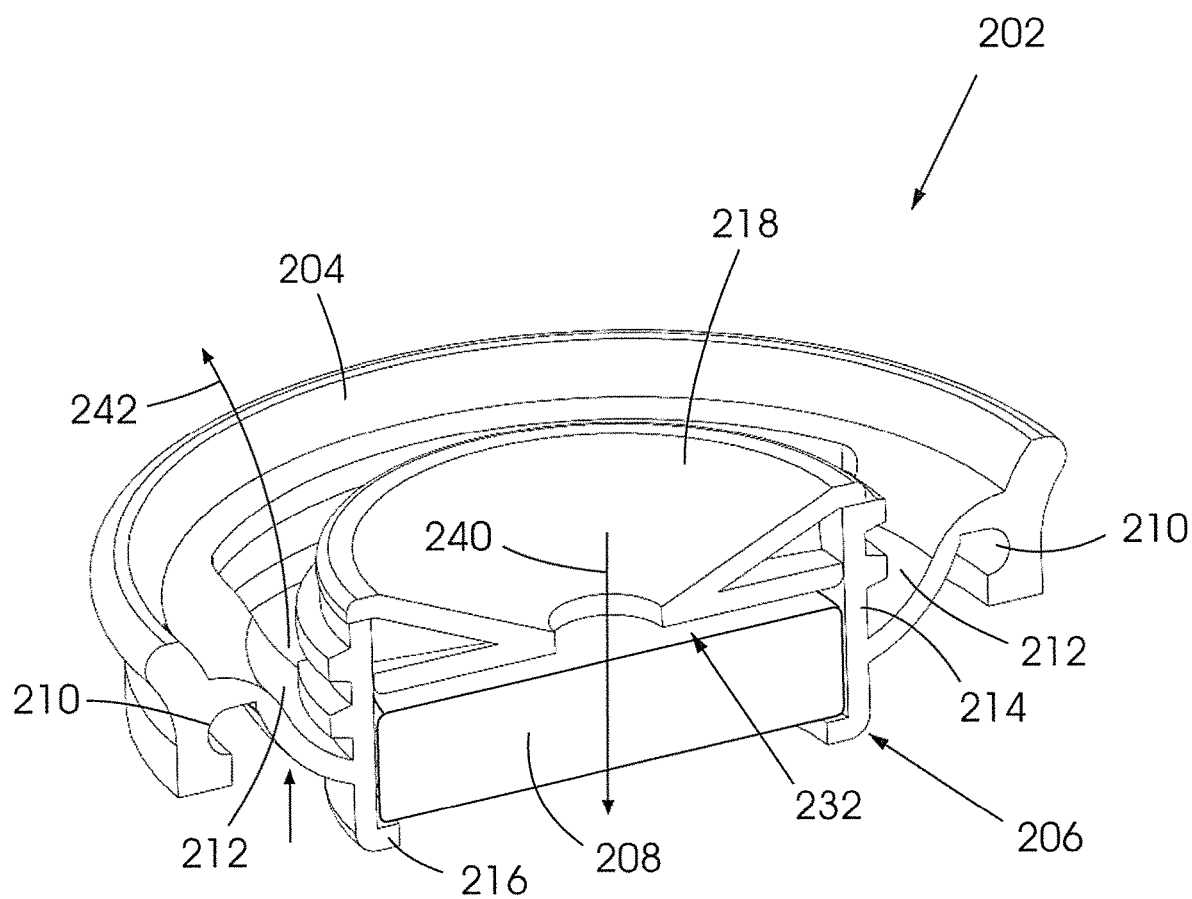
FIG. 16 shows an enlarged, assembled perspective view of the nozzle of the device of FIG. 15.

Similarly to the second embodiment of the device 100, the nozzle 202 of the second embodiment 200 includes a removable filter retaining member 218, which is also referred to as a valve. The filter retaining member 218 is shows in perspective view in FIG. 19 and cross-sectional perspective view in FIG. 20. From these figures it can be seen that the filter retaining member 218 is similar to the member 122 of the second embodiment. The filter retaining member 218 has a funnel-shaped first portion 120 which is, in use, its upper portion and a circular second portion 222 which is, in use, its lower portion. The lower portion 222 protrudes from the upper portion 220 and is received in the filter holder 206 when the retaining member 218 is attached to the filter holder 206 so as to retain the filter element 208 inside the filter holder 206. At its periphery the lower portion 222 terminates in an annular rim 224 which is adjacent to, and preferably abuts, the body 214 of the filter holder 206 when located therein. As shown in FIGS. 15 and 16, the retaining member 218 closes off the open, upper end of the filter holder 206 through which the filter element 208 is, in use, received. Preferably, the annular rim 224 and the body 214 of the filter holder 206 are dimensioned so as to create a tight fit or press fit connection 206 when they engage one another.

Returning to FIGS. 11 and 12, the funnel-shaped upper portion 220 of the retaining member 218 again has a larger end 226, which forms the circular, upper end of the retaining member 218, and a smaller, lower end 228 terminating at a central hole 230 running axially through the retaining member. The larger, upper end 226 has a diameter larger than that of the upper end of the body 214 of the filter holder 206, thereby allowing the funnel-shaped portion 220 to extend radially beyond the inner periphery of the upper end of the body 214 of the filter holder 206. In other words, the external diameter of the larger end 226 of the upper portion 220 is greater than the internal diameter of the body 214 of the filter holder 206.

In use, when filling the container 12 the filter retaining member 218 is again typically attached to the filter holder 206 such that its funnel-shaped upper portion 220 can be used to fill the container. As described above, when filing the container 12, the funnel shaped upper portion 220 is pressed against an outlet of the water source, such as a faucet or tap, for example. By pressing the funnel shaped upper portion 220 against the outlet of the tap a seal is created to prevent water from escaping. It should be understood that, as a result of the seal created between the upper portion 220 and the tap outlet, water is forced through the central hole 230 and through the filter element 208. Again, a chamber 232 is created between the filter element 208 and the lower portion 222 of the filter retaining member 218 in order to allow water to be distributed evenly over the entire surface area of the filter element 208. As a result, the entire surface area of the filter element 208 is used to filter the water while filling the container 12.

Although it is envisaged that the funnel shaped upper portion 220 could be similar in construction to the upper portion of the second embodiment, in this illustrated third embodiment it is in the form of an over-moulded rigid structure. The term over-moulded is used to indicate that the valve 218 is made from a substantially rigid material which is at least partially covered by a second material. The second material is preferably a softer material in order to improve the seal created between the funnel shaped upper portion 220 and the outlet of the tap when filling the container 12. It is further envisaged that the second, softer material could be an elastic material. It is further envisaged that the elastic material could be TPE—, such as Monprene or Polyurethane 32 shore A hardness, for example. It is also believed that silicone could be used. These materials all have the necessary elasticity to create a seal when pressed against the faucet during filling. Again, the fluid tight seal created between the upper portion 220 and the faucet increases the fluid pressure in order to force the water through the filter element 208, thereby increasing the rate at which the container 12 is filled.

Although the funnel shaped upper portion 220 and the lower portion 222 again define a V-shaped annular space 334 between them, in this third embodiment of the device 200 the V-shaped space contains ribs 336. It should be understood that the ribs 336 provide structural support to the upper portion 220.

The funnel shaped upper portion 220 is again dimensioned to allow a wide range of different sized tap outlets to be used when filling the container 12 substantially similar to the second moment of the device 100.

Figure 17:
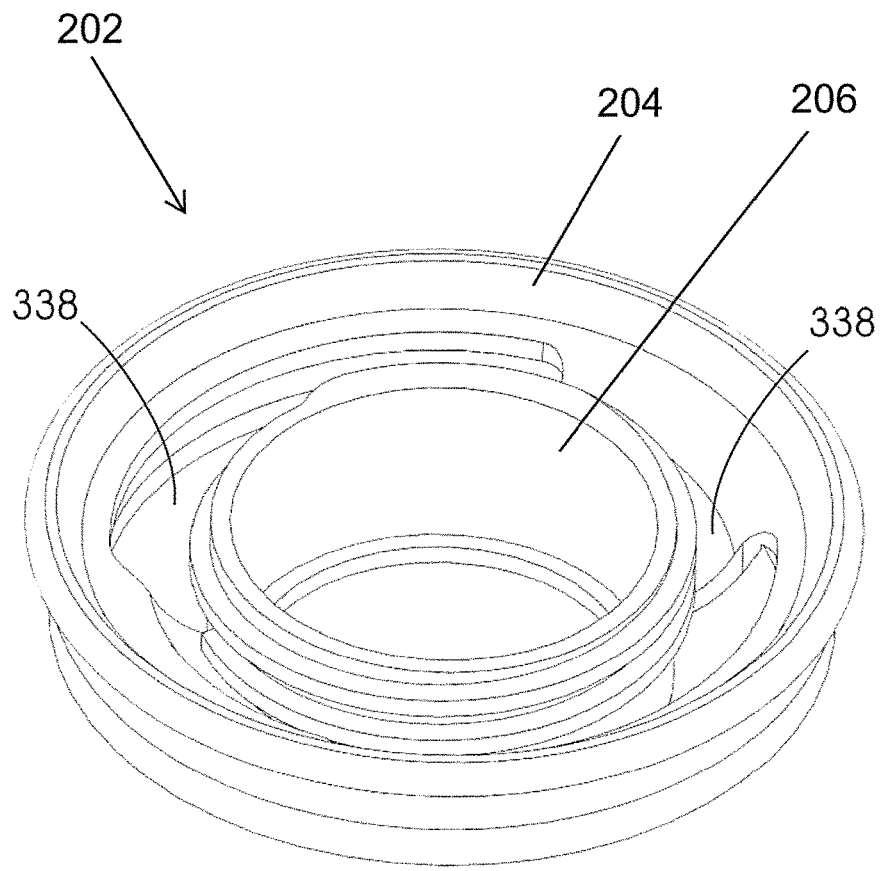
FIG. 17 shows a top perspective view of the nozzle of FIG. 16.
Figure 18:
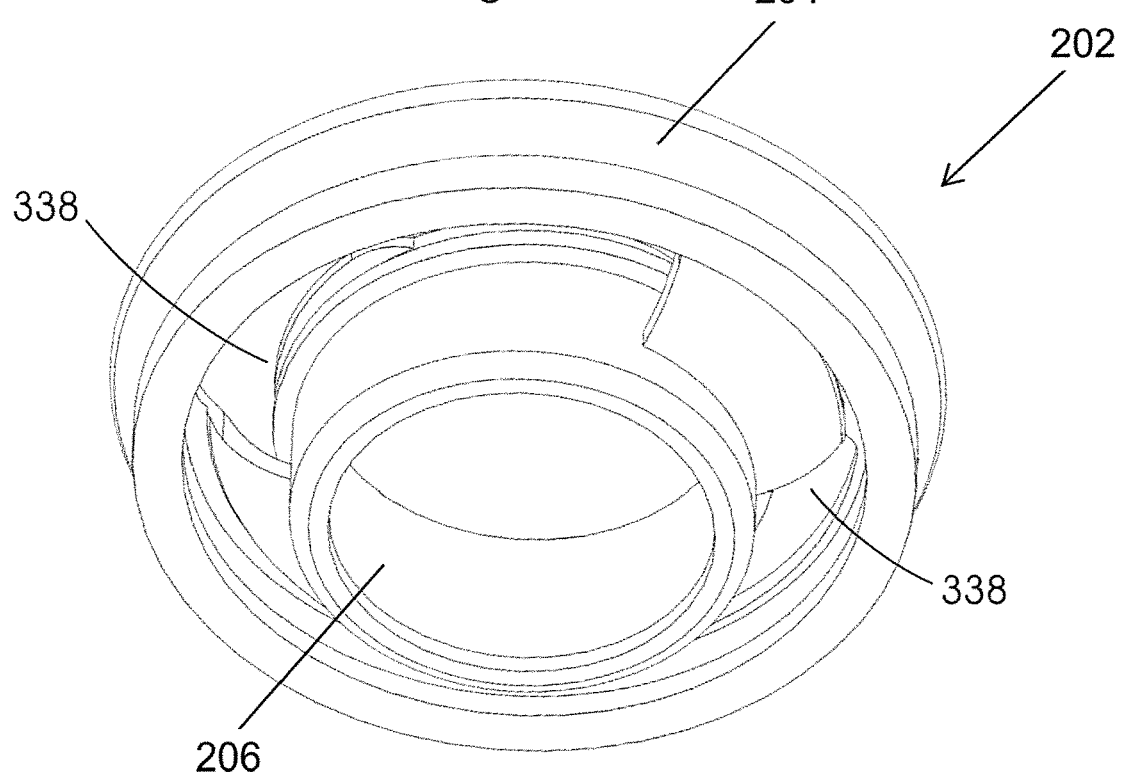
FIG. 18 shows a bottom perspective view of the nozzle of FIG. 16.
Figure 19:
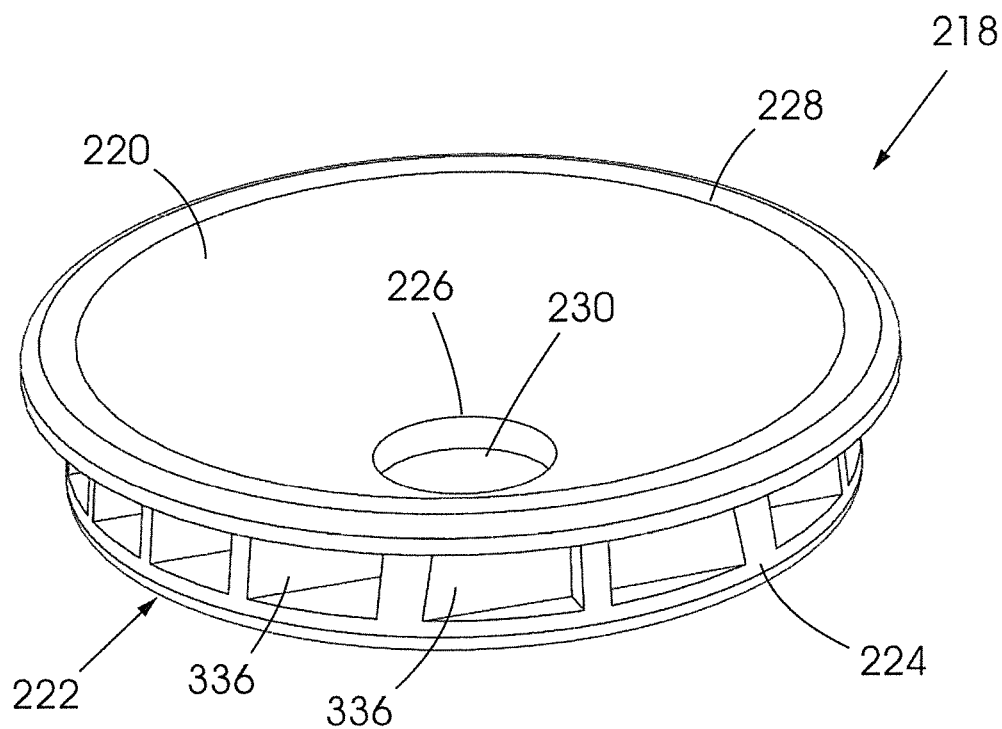
FIG. 19 shows a top perspective view of a filter retaining member of the device of FIG. 15.
Figure 20:
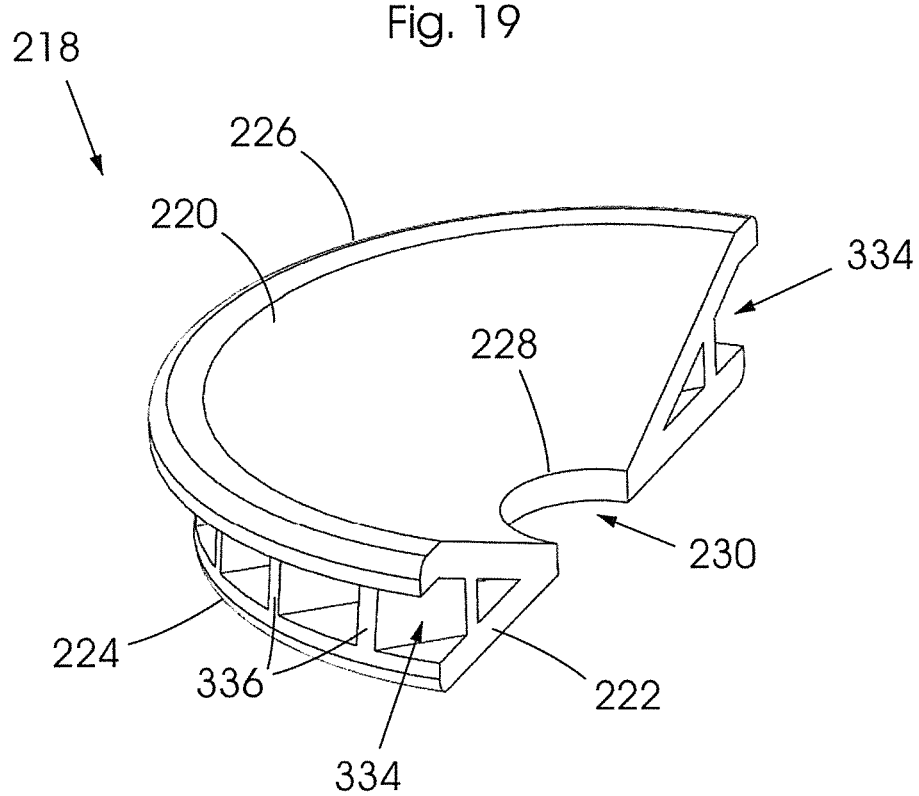
FIG. 20 shows a cross-sectional perspective view of the filter retaining member of FIG. 19.

Referring now to FIGS. 17 and 18 it can be seen that openings 338 are again formed between the inner rim 206 and outer rim 204. In other words, the openings 338 are formed between the filter holder 206 and the spout 204. In this third embodiment 200 of the device there are only two semi-annular openings 338. In this embodiment the openings 338 are in the form of circumferential slots. Again, the opening 338 in use allows water to flow through them when dispensing water from the container 12.

Returning now to FIG. 16, the nozzle 202 defines a first fluid flow path 240 along which fluid flows when filling the container 12 and a second fluid flow path 242 along which fluid flows when dispensing water from the container. The first fluid flow path 240 again runs substantially straight through the cylindrical body 214 of the filter holder 206 so that the filter element 208 is positioned in the first fluid flow path, thereby filtering the water when filling the container 12. The second fluid flow path 242, in turn, runs substantially along the contours of the sidewall of the container 12 and through the openings 138 in the nozzle 202. The filter element 208 is accordingly positioned outside the second fluid flow path 242 so that the flow of water is unobstructed by it when dispensing water from the container 12. Similarly to the first and second embodiments 10, 100 of the device the second fluid flow path 242 provides substantially unobstructed flow of water from the container 12 to allow for a natural drinking action in drinking water directly from the bottle. This unobstructed or free flow of water from the container 12 also allows water to be poured from the container.

Similarly to the first and second embodiments 10, 100 of the device, the third embodiment 200 also includes a removable closure 244 illustrated in FIG. 15. The closure 244 again does not carry a retaining formation for retaining the filter element in the filter holder. As can be seen in FIG. 15 the closure 244 is removable connectable to the nozzle 202 and in particular the filter holder 206 of the nozzle 202. The closure 244 and filter holder 206 carry complementary connecting means which allows for the removable connection between the closure and the nozzle. In this third embodiment 200 of the device the complementary connecting means is shown as a threaded connection. The closure 244 carries an internal thread 246 while the filter holder 206 carries an external thread 250. It should be clear that in order to close-off the first and second fluid flow paths 240 and 242 the closure is simply threaded onto the nozzle. In its closed position, i.e. when the closure 244 is connected to the nozzle 202, the closure 244 abuts the outer rim or spout 204, thereby closing-off the container. In this closed position water is prevented from being dispensed from the container 12.

The method of filtering fluid by using the bottle 200 and dispensing fluid from the bottle should be apparent from the above description and will therefore not be described again in any detail.

From the above description it should be clear that the invention provides a filtering device that is easily transportable while still allowing a natural drinking action. The natural drinking action is mainly achieved by creating a fluid flow path through which water is dispensed that is different from the fluid flow path when filling the container and filtering the water. The same features allowing for a natural drinking action when drinking directly from the bottle also allow water to be poured from the bottle freely. This is an advantage to prior art bottles which only allows water to be dispensed from them by applying suction to their nozzles or by applying a possible pressure by squeezing them. The collapsible sidewall of the container, in turn, provides for easy transportation of the bottle when in its inoperative, collapsed state.

The invention claimed is:

1. A nozzle for a fluid purification device including a container, the nozzle including a spout which is used to drink from the container and a filter holder suitable for carrying a removable filter element, the filter holder having a funnel-shaped first portion, which is in use its upper portion, defined by a removable filter retaining member and a second portion, which is in use its lower portion, carrying the removable filter element, the second portion being made from a first, substantially rigid material while the funnel-shaped first portion is covered by a second material, which is softer than the first material such that at least a part of the funnel-shaped first portion of the filter holder is deformable when being pressed against an outlet of a fluid source so as to create a fluid tight seal between it and the outlet of the fluid source when pressed against the outlet while filling the container such that the fluid pressure is increased as a result of the fluid tight seal in order to force fluid through the removable filter element when filling the container, wherein the nozzle defines a first fluid flow path along which fluid flows when, in use, filling the container and a second fluid flow path along which fluid flows when, in use, dispensing fluid from the container, wherein the fluid flow paths are arranged such that, when located in the nozzle, the removable filter element is positioned in the first fluid flow path so that the fluid is filtered when filling the container and positioned outside the second fluid flow path so that the flow of fluid is unobstructed by it when dispensing fluid from the container thereby allowing a natural drinking action, in use, whereby the fluid within the container is allowed to be poured from the container without having to apply positive or negative force to drive the flow of fluid.

2. The nozzle of claim 1, wherein the filter holder has a fluid receiving passage forming part of the first fluid flow path in which the removable filter element is located when being carried by the filter holder, thereby filtering the fluid through the removable filter element when filling the container.

3. The nozzle of claim 1, wherein the spout and filter holder define a fluid dispensing passage between them, the fluid dispensing passage forming part of the second fluid flow path along which fluid is dispensed from the container.

4. A fluid purification device including:
   a container having at least partially flexible sidewalls so that it is collapsible from a first, operative condition into a second, inoperative condition;
   a nozzle according to claim 1, the nozzle being connectable to the container; and
   a removable filter element which is carried by the nozzle such that it is positioned in the first fluid flow path so that the fluid is filtered when filling the container and positioned outside the second fluid flow path so that the flow of fluid is unobstructed by it when dispensing fluid from the container thereby allowing a natural drinking action, in use.

5. The fluid purification device of claim 4, wherein the nozzle includes an outer, annular rim forming a drinking spout to drink from the container and an inner, annular rim forming the filter holder.

6. The fluid purification device of claim 5, wherein the outer and inner rims define a fluid dispensing passage between them, the fluid dispensing passage forming part of the second fluid flow path along which fluid is dispensed from the container.

7. The fluid purification device of claim 4, wherein the filter holder defines a fluid receiving passage forming part of the first fluid flow path in which the removable filter element is located when being carried by the filter holder, thereby filtering the fluid through the removable filter element when filling the container.

8. The fluid purification device of claim 4, wherein a chamber is located between the removable filter element and the lower portion to allow fluid to be distributed evenly over substantially the entire surface of the removable filter element, thereby allowing substantially the entire surface area of the removable filter element to be used when filtering the fluid while filling the container.

\* \* \* \* \*